C. PAY.
LIFTING DEVICE FOR DUMPING WAGONS.
APPLICATION FILED MAY 4, 1911.
1,000,622.
Patented Aug. 15, 1911.
2 SHEETS—SHEET 1.
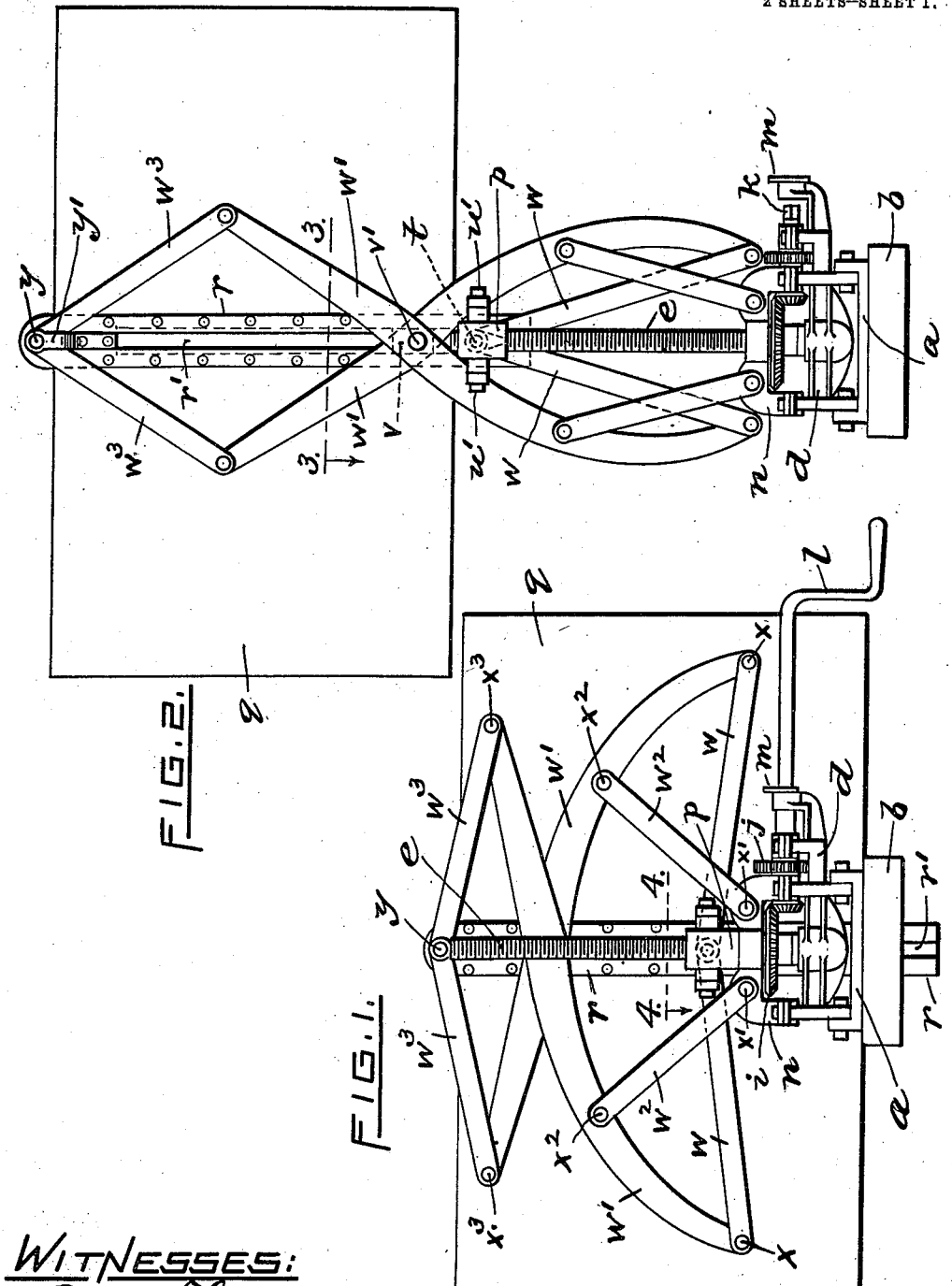
WITNESSES:
INVENTOR:
Charles Pay.
By Charles T. Hannigan,
Attorney.

C. PAY.
LIFTING DEVICE FOR DUMPING WAGONS.
APPLICATION FILED MAY 4, 1911.
1,000,622.
Patented Aug. 15, 1911.
2 SHEETS—SHEET 2.
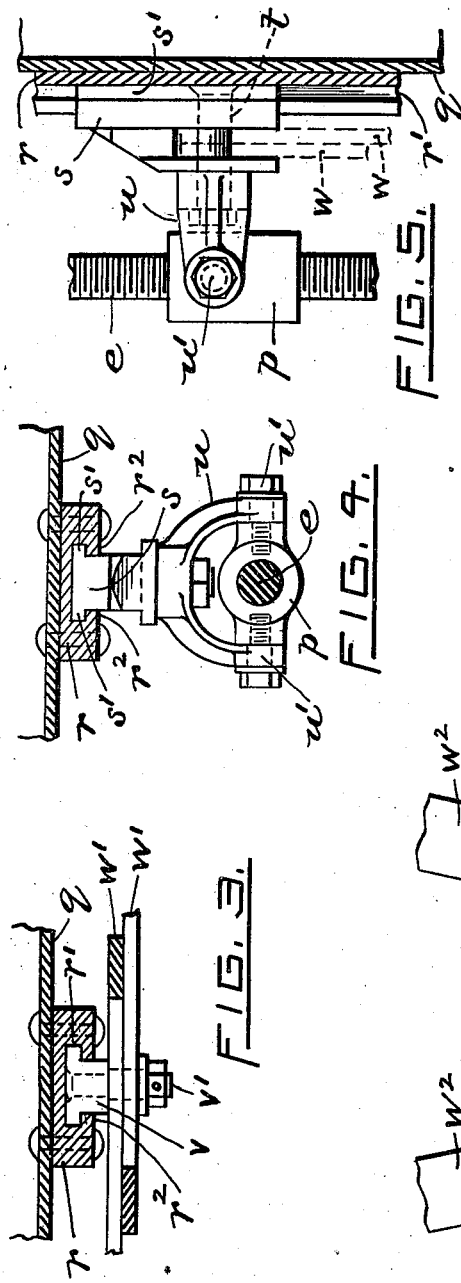
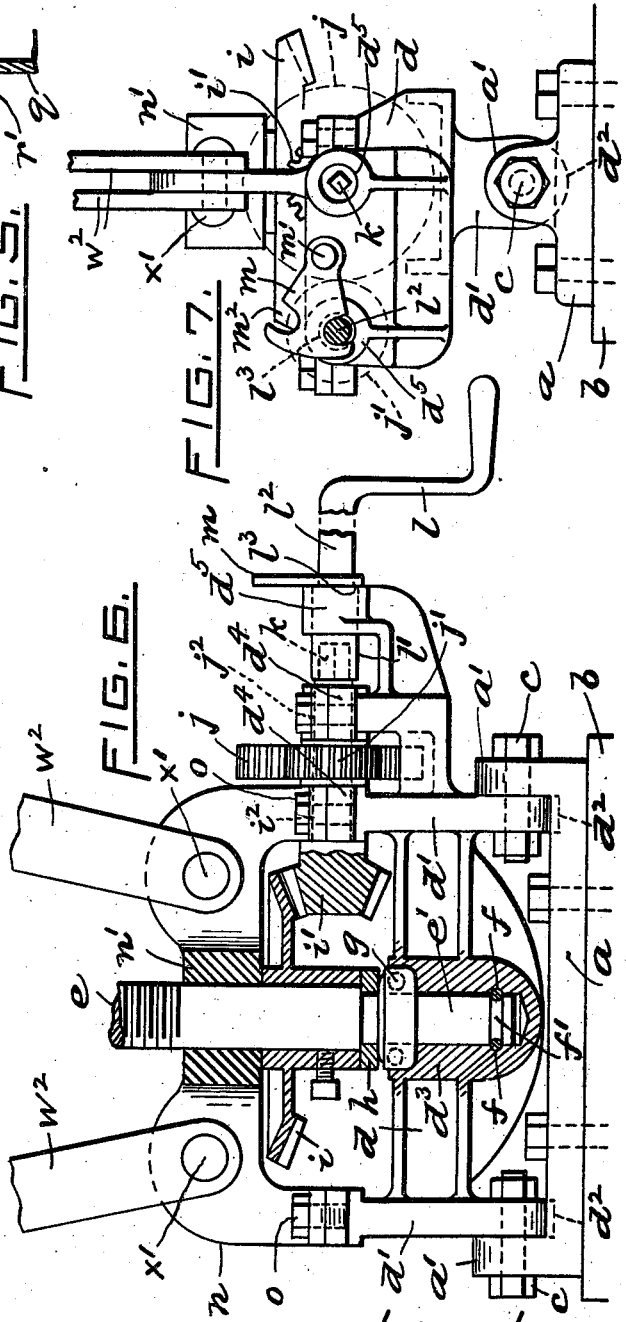

UNITED STATES PATENT OFFICE.

CHARLES PAY, OF PROVIDENCE, RHODE ISLAND.

LIFTING DEVICE FOR DUMPING-WAGONS.

1,000,622.  Specification of Letters Patent.  Patented Aug. 15, 1911.

Application filed May 4, 1911. Serial No. 624,892.

*To all whom it may concern:*

Be it known that I, CHARLES PAY, a citizen of the United States, residing at the city of Providence, in the county of Providence and State of Rhode Island, have invented certain new and useful Improvements in Lifting Devices for Dumping-Wagons, of which the following is a specification.

This invention is designed for use on heavy four-wheel carts in which the rear axle or perches-hinge acts as a fulcrum for the cart-body to be tipped over; and the object in view is to provide a mechanical lifting device which may be easily operated by the driver to tip the cart-body to unload its contents.

A further object of my invention is to provide a device of this character with a relatively short hoisting screw-shaft which is actuated by a novel gearing arrangement, and a system of levers movable upon the cart front and actuated by the nut of said shaft to further increase the lifting movement of the cart front as the nut reaches to its limit of upward movement on said shaft.

With the above and other objects in view, the invention consists of the novel construction, arrangement, and combination of parts as hereinafter described and claimed, reference being had to the accompanying drawings, in which:—

Figure 1 is a front elevation of a cart or truck, showing my improved lifting device applied thereto, as when the cart-body is on a level and loaded. Fig. 2 is a similar view, showing the relative position of parts of the lifting device, when the cart-body is tipped up to unload. Fig. 3 is a detail plan section taken on line 3.—3. of Fig. 2, showing a guide-plate secured on the cart front, a slide block on said plate, and crossed levers pivoted on a stud of said block. Fig. 4 is a detail plan section taken on line 4.—4. of Fig. 1, showing arrangement of the shaft-nut as carried by the cart front. Fig. 5 is a side view partly in section and partly in elevation showing the manner of mounting the shaft-nut upon the cart front. Fig. 6 is a view, partly in section and partly in elevation, of the gearing arrangement for the lifting device and showing the manner of mounting upon the perches of the cart, and, Fig. 7 is an end view of Fig. 6, the hand-crank being shown in cross-section.

Like reference characters indicate like parts.

A plate $a$ is secured upon the front portion of the cart-perches $b$, and said plate has upwardly-extending ears $a^1$, $a^1$ which are each provided with an opening registering opposite each other to receive bolts that act as pivot centers, as $c$, $c$.

My improved gearing arrangement is mounted on a supporting member $d$, said member having side uprights $d^1$, $d^1$ which are mounted upon the bolts $c$, $c$ of the plate $a$, and each upright having its bottom portion rounded to rest upon concave surfaces formed in the said plate $a$, as at points $d^2$, $d^2$ in Figs. 6 and 7. Between the uprights of the member $d$ is a hub $d^3$ which is bored to act as a step for a reduced concentric portion $e^1$ of the hoisting screw-shaft $e$, said shaft being prevented from displacement on said hub, by means of dowel pins $f$, $f$ which are made fast in the latter and enter a groove formed in the reduced portion of said shaft, as at $f^1$. The hub $d^3$ of the supporting member $d$ is provided with a recess formed in its upper portion to receive an anti-friction roller cage $g$, which surrounds the reduced part $e^1$ of the screw-shaft $e$, and a collar $h$ is interposed between the shoulder formed by said reduced part and said collar rests upon the rotative plate of said cage.

On the screw-shaft $e$ is made fast a large bevel gear $i$ which meshes with a pinion $i^1$ whose shaft $i^2$ is mounted in bearings of the supporting member $d$, as at points $d^4$, $d^4$. On the shaft $i^2$ of the bevel pinion $i^1$ is made fast a large spur gear $j$ which meshes with a pinion $j^1$, whose shaft $j^2$ is mounted in a bearing formed in the supporting member $d$ at the right of this spur pinion, as at $d^4$ in Fig. 6, and the outer end of each shaft $i^2$ and $j^2$ is squared, as at $k$, to fit within an aperture formed in the engaging portion $l^1$ of a hand crank $l$. In Fig. 7, are shown the relative positions of the spur gears, as indicated by their pitch circles, $j$, $j^1$.

The supporting member $d$ has two bearings $d^5$, $d^5$, which are bored concentric to the bearings of the shafts $i^2$ and $j^2$, to receive the engaging portion $l^1$ of the crank. The shank $l^2$ of the crank is of lesser diameter than the engaging portion of the latter, to form a shoulder, which, when the crank is mounted on the flattened end of either shaft $i^2$, $j^2$, meets with the outer face of either bearing $d^5$, as at a point $l^3$ in Fig. 6, in order that a latch $m$ which is pivoted, at $m^1$, on the supporting member $d$ may be swung to engage by its openings $m^2$ upon the shank $l^2$ and bear against the said shoulder in locking the crank in place upon either shaft $i^2$, $j^2$.

A yoke member $n$ passes over the large bevel gear $i$ and has its ends secured by bolts $o$, $o$ upon the supporting member $d$, and said member $n$ has a central hub $n^1$ which is bored to receive the screw-shaft $e$. This shaft $e$ extends from the yoke-hub $n^1$ to the top of the cart-body, when the latter is on a level, and this portion of said shaft is provided with a single right-hand screw-thread to engage the nut $p$, which is carried by the cart front $q$. A vertically-arranged plate $r$ is secured centrally upon the cart front $q$ and provided with a guide-way $r^1$ to receive two slide blocks $s$ and $v$ therein.

The block $s$ has side flanges $s^1$, $s^1$ which bear against inwardly projecting integral flanges $r^2$, $r^2$ of the plate $r$, and said block is provided with a fixed pin $t$ which passes through a forked portion of said block to receive therebetween the ends of lever connections $w$, $w$. Between the block $s$ and the screw-nut $p$ is a yoke member $u$ whose central part is pivoted upon the pin $t$ and the free ends of said member also pivoted on oppositely-disposed studs $u^1$, $u^1$, which are secured in the sides of the said nut $p$, and thus a universal joint connection is had between the latter and the said block $s$. The block $v$ is also provided with side flanges to slide in the guide-way $r^1$ and bear against the flanges $r^2$ of the guide-plate $r$, and in this block is made fast a pin $v^1$ which passes through the crossed portions of levers $w^1$, $w^1$, which have their lower free ends connected to the free ends of the levers $w$, $w$, as at points $x$, $x$ in Fig. 1.

The lever connections $w$, $w$ move between two pair of arms $w^2$, $w^2$, one end of each pair of arms being connected to a pin secured in each end portion of the yoke member $n$, as at points $x^1$, $x^1$ in Fig. 1, and each pair of said arms diverge outwardly and have their other ends connected to pins secured in the lower portions of the crossed levers, as at points $x^2$, $x^2$ in said figure.

At the upper part of the guide-plate $r$, which terminates slightly above the top of the cart front, is made fast a pin $y$ whose outer portion is held by a support $y^1$ secured upon said plate, and levers $w^3$, $w^3$ have one of their ends connected to said pin and their other ends connected to the upper free ends of the crossed levers $w^1$, as at points $x^3$, $x^3$.

The ratio of the bevel gears $i$, $i^1$ is 3 to 1, and that of the spur gears $j$, $j^1$ is 2 to 1.

Having now described the parts embodying my improvements, the operation is as follows: The crank is first brought to a locked engagement with the shaft of the small spur gear $j^1$, in the manner shown in Figs. 6 and 7. As the gearing arrangement actuates the screw-shaft to carry upward the nut $p$ the arms $w^2$, which are held at their fixed points $x^1$, exert an inward pull in connection wth the levers $w$ upon the crossed levers $w^1$, and thereby carry inwardly the points $x$. As the load rises, the nut $p$ and block-pin $v^1$ approach each other, and the weight remains constant upon the nut $p$, the levers $w^2$ and pin $y$ during the entire lifting operation. After the nut $p$ has fed near to its limit of upward travel a straightening up of the system of levers, as described, is obtained which further elevates the cart front to the highest position desired, to cause the load to slide out of the cart. For a quick unwinding of the lifting mechanism, as described, the crank $l$ is brought to a locked engagement with the shaft $i^2$ of the bevel gear $i^1$. Thus by means of a system of levers to operate in conjunction with a relatively short hoisting screw-shaft, as shown, the cart-body may be readily brought to an incline of 35°.

I have found through practical demonstration that by use of this mechanism one man is enabled to operate in lifting a load of seven tons in about ten minutes. But for a still quicker lift I may design the shaft-support $d$ to receive a second crank for operating the gearing arrangement, in the manner described, at the opposite side of the cart or truck.

While I have herein described in detail the preferable embodiment of the invention as practiced by me, yet it will be evident that various changes may be made in the details of construction without departing from the general spirit of the invention.

What I claim and desire to secure by Letters-Patent, is:—

1. In a device of the character described, comprising a relatively short hoisting screw-shaft; a swinging gearing arrangement supported by the cart-perches and designed to actuate said shaft; a nut carried by the cart front and engaging the thread of said shaft; a system of levers carried upon the cart front, and arm connections from the gearing arrangement to exert a pull upon and straighten up the system of levers and thereby obtain a further increase of lifting movement by the cart front, after said nut has reached near to its limit of travel on said shaft.

2. In a device of the character described, comprising a plate secured on the cart-perches; a swinging support on said plate; a relatively short screw-shaft stepped in said support; a gearing arrangement mounted on said support to actuate said shaft; a yoke secured on said support; a swinging nut carried upon the cart front and engaging the thread of said shaft; a system of levers carried upon the cart front; and arm connections from said yoke to said levers to cause the latter to further elevate the cart front as said nut reaches near to its limit of movement on said shaft.

3. In a device of the character described, comprising a plate secured on the cart-perches; a swinging support on said plate; a screw-shaft stepped in said support; a gearing arrangement mounted on said support to actuate said shaft; a vertically-arranged guide-plate secured on the cart front; a block slidable in said guide-plate; a nut engaging the thread of said shaft; a universal joint connection from said block to said nut; a second block slidable in said guide-plate; a system of levers carried by the said last mentioned block, and means carried by said support and actuated by said nut to further increase the lifting movement of the cart front, after said nut has reached near to its limit of travel on said shaft.

4. In a device of the character described, comprising a relatively short vertically-arranged screw-shaft; a manually-operated gearing arrangement to actuate said shaft; a fixed yoke carried by the gearing arrangement; a nut carried upon the cart front and engaging the thread of said shaft; a slidable block above said nut and carried upon the cart front; crossed levers pivoted at their points of cross over, upon said block and said levers having their lower portions curved outwardly; lever connections from said nut to the lower free ends of said crossed levers; arm connections from said yoke to the middle of the curved portions of said crossed levers; a fixed pin at the upper part of the cart front, and lever connections from said pin to the upper free ends of said crossed levers, so constructed that when the nut reaches to its upward limit of movement on said shaft the closing action of the system of levers will have further increased the upward elevating movement of the cart front.

5. In combination with a vertically-arranged hoisting screw-shaft, a plate secured on the cart-perches and said plate provided with concave bearing surfaces; a swinging support for said shaft and said support pivoted on said plate and having rounded portions to rest upon the bearing surfaces of the latter; a bevel gear secured on said shaft; a rotatable shaft mounted in said support and having a flattened end; a pinion secured on the said last mentioned shaft and in mesh with said gear; a spur gear made fast on the said last mentioned shaft; a rotatable shaft mounted in said support and having a flattened end; a pinion made fast on the said last mentioned shaft and in mesh with said spur gear, and means carried by said support to permit a hand crank to be held in locked engagement with the flattened end of either shaft.

6. In combination with a hoisting screw-shaft, a plate secured on the cart-perches and provided with concave bearing surfaces; a swinging support having a bored hub to act as a step for said shaft, and said support having an outer journal bearing to receive the engaging end portion of a hand crank; means mounted in the hub to lessen the friction of the load upon said shaft; a bevel gear fast on said shaft; a shaft mounted in bearings of said support and having a flattened end to fit within a squared aperture formed in the engaging end of the crank; a pinion in mesh with said gear and fast on the said last mentioned shaft, and a latch pivoted on said support and designed to bear against a shoulder formed on the crank and thereby hold the latter in locked engagement with the flattened end of the said last mentioned shaft.

In testimony whereof I affix my signature in presence of two witnesses.

CHARLES PAY.

Witnesses:
C. T. HANNIGAN,
PETER C. CANNON.

---

Copies of this patent may be obtained for five cents each, by addressing the "Commissioner of Patents, Washington, D. C."